(12) United States Patent
Kalwara et al.

(10) Patent No.: US 9,133,622 B2
(45) Date of Patent: Sep. 15, 2015

(54) FORTIFIED FLASHING LAMINATE

(71) Applicant: FIRESTONE BUILDING PRODUCTS CO, LLC, Indianapolis, IN (US)

(72) Inventors: Joseph John Kalwara, Indianapolis, IN (US); Daniel Leon Barksdale, Brownsburg, IN (US); Todd David Taykowski, Noblesville, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 0 days.

(21) Appl. No.: 14/159,842

(22) Filed: Jan. 21, 2014

(65) Prior Publication Data

US 2014/0134373 A1   May 15, 2014

Related U.S. Application Data

(63) Continuation-in-part of application No. 13/351,577, filed on Jan. 17, 2012, now Pat. No. 8,631,611.

(60) Provisional application No. 61/433,741, filed on Jan. 18, 2011.

(51) Int. Cl.
*E04D 1/36* (2006.01)
*B32B 33/00* (2006.01)
(Continued)

(52) U.S. Cl.
CPC .............. *E04D 13/0404* (2013.01); *B32B 7/06* (2013.01); *B32B 7/12* (2013.01); *B32B 27/06* (2013.01); *B32B 27/302* (2013.01); *B32B 27/32* (2013.01); *C09J 7/0296* (2013.01); *E04D 1/30* (2013.01); *E04D 13/064* (2013.01); *E04D 13/0725* (2013.01); *E04D 13/1407* (2013.01); *E04D 13/1415* (2013.01); *E04D 13/155* (2013.01); *B32B 2307/54* (2013.01); *B32B 2307/748* (2013.01); *B32B 2419/06* (2013.01); *C09J 2201/28* (2013.01); *F16B 11/006* (2013.01); *Y10T 156/1074* (2015.01); (Continued)

(58) Field of Classification Search
CPC ....... E04D 1/30; E04D 13/064; E04D 13/155; E04D 13/0404; E04D 13/0705; E04D 13/1407; E04D 13/1415; B32B 7/06; B32B 7/12; B32B 27/32; B32B 27/302; B32B 2307/54; B32B 2307/748; B32B 2419/06; C09J 7/0296; C09J 2201/28; F16B 11/006; Y10R 156/1074; Y10T 428/1476; Y10T 428/24752; Y10T 428/24942
USPC ................... 52/58, 60, 62, 199, 309.1, 309.3, 52/309.13, 745.06, 746.11; 428/40, 147
See application file for complete search history.

(56) References Cited

U.S. PATENT DOCUMENTS 2,373,317 A    4/1945   Lawson
2,405,325 A    8/1946   Parsons et al.
(Continued)

*Primary Examiner* — Jeanette E Chapman
*Assistant Examiner* — James Buckle, Jr.
(74) *Attorney, Agent, or Firm* — Jason A. Houser; Arthur M. Reginelli

(57) ABSTRACT

A fortified flashing laminate includes an uncured thermosetting polymeric layer having a top surface and a bottom surface. A first layer of vulcanized adhesive tape covers at least a portion of the bottom surface of the polymeric layer, and a second layer of vulcanized adhesive tape covers a portion of the first layer of vulcanized adhesive tape to form a fortified area. The size and positioning of the second layer of vulcanized adhesive tape may be selected to fortify known vulnerable areas of flashing laminates.

20 Claims, 7 Drawing Sheets

(51) Int. Cl.
  *E04D 13/04* (2006.01)
  *E04D 1/30* (2006.01)
  *E04D 13/14* (2006.01)
  *E04D 13/155* (2006.01)
  *E04D 13/064* (2006.01)
  *E04D 13/072* (2006.01)
  *B32B 7/06* (2006.01)
  *B32B 7/12* (2006.01)
  *B32B 27/06* (2006.01)
  *B32B 27/30* (2006.01)
  *B32B 27/32* (2006.01)
  *C09J 7/02* (2006.01)
  *F16B 11/00* (2006.01)

(52) U.S. Cl.
  CPC ... *Y10T 428/1476* (2015.01); *Y10T 428/24752* (2015.01); *Y10T 428/24942* (2015.01)

(56) References Cited

U.S. PATENT DOCUMENTS

| | | |
|---|---|---|
| 3,277,618 A | 10/1966 | Smith |
| 4,386,488 A | 6/1983 | Gibbs |
| 4,389,826 A | 6/1983 | Kelly |
| 4,932,171 A | 6/1990 | Beattie |
| 4,934,117 A | 6/1990 | Barksdale |
| 4,965,119 A | 10/1990 | Sancaktar |
| 5,204,148 A | 4/1993 | Alexander et al. |
| 5,706,610 A | 1/1998 | Mayle |
| 5,804,661 A | 9/1998 | Davis et al. |
| 5,859,114 A | 1/1999 | Davis et al. |
| 5,983,592 A | 11/1999 | Mayle |
| 6,006,482 A | 12/1999 | Kelly |
| 6,108,981 A | 8/2000 | Sama et al. |
| 6,185,885 B1 | 2/2001 | Thaler |
| 6,199,326 B1 | 3/2001 | Mayle |
| 6,291,542 B1 | 9/2001 | Hubbard et al. |
| 7,662,886 B2 | 2/2010 | Park |
| 8,567,143 B2 | 10/2013 | Kalwara et al. | ure
FORTIFIED FLASHING LAMINATE

This application is a continuation-in-part application of U.S. Non-Provisional application Ser. No. 13/351,577, filed on Jan. 17, 2012, which claims priority from U.S. Provisional Patent Application Ser. No. 61/433,741 filed on Jan. 18, 2011, which are incorporated herein by reference in their entirety.

FIELD OF THE INVENTION

One or more embodiments of the present invention relate to a fortified flashing laminate for installation in a roofing system. In certain embodiments the fortified flashing laminate may include a reinforcing layer of adhesive tape at one or more vulnerable areas of the flashing laminate.

BACKGROUND OF THE INVENTION

The construction industry commonly uses single ply membranes to provide a waterproof barrier on flat or low-slope roofs. It is prohibitively expensive and difficult to produce and transport a single membrane that is sized to cover an entire roof surface, thus, a plurality of individual membranes are often provided and oriented in an overlapping arrangement. The overlapping portions, or splices, of these individual membranes must be secured together to ensure that the plurality of membranes form a single waterproof surface.

In many cases, flashings are used to seal certain locations of the roofing membranes where the membranes meet, such as corners or walls. One type of flashing used is referred to as a tape flashing, which is a laminate and includes a polymeric layer of thermosetting flashing material (i.e., EPDM) laminated to a layer of vulcanized tape adhesive. The polymeric layer may be provided in an uncured state and then cured by exposure to heat over time after being installed on the roof. The polymeric layer of the flashing laminates are formable when in the uncured state, which facilitates installation of the flashing laminate by allowing it to conform to the underlying surfaces (e.g. corners). However, these uncured flashing laminates are susceptible to punctures, slits, cuts and impact damage, as well as damage caused by building movement and/or wall movement prior to curing of the polymeric layer.

Flashing laminates are often provided in specific sizes and shapes designed for installation at specific locations of the roofing system or edges of the membrane. For example, flashing laminates may include those intended for installation at an outer corner of vertical walls, at the base of curb surfaces, around penetrations through the roofing system, and at a metal flashing, such as a gravel stop, provided at the edge of the roof surface. Certain areas of these flashing laminates are particularly vulnerable to damage while the flashing is in an uncured state. Specifically, the areas where the flashing laminate transitions from a horizontal surface to a vertical surface are particularly vulnerable. In addition, areas at the outer corners of vertical surfaces can also be vulnerable to damage during installation of the flashing tape.

U.S. Pat. No. 5,204,148 discloses an improved laminate cover or patch for sealing an opening in a roofing membrane. The laminate cover includes a top sheet, a lower sheet, and a layer of flowable sealing material. The top sheet includes a weather resistant material, and a complimentary shaped and sized lower sheet of a lightly cured butyl rubber having opposed tacky surfaces. The layer of a flowable sealing material, such as an uncured butyl rubber sealing compound, having a smaller dimension than that of the lower sheet, is trapped between the bottom sheet and a bottom release coated carrier. The layer of flowable sealing material is designed to provide an improved seal over an opening in a roofing membrane, and would not be effective in provided added tensile strength or puncture resistance to the laminate because the sealing material is uncured.

Thus, there is a need for an improved flashing laminate that reduces the risk of damage to the flashing during installation and during the curing period without appreciably affecting the formability of the flashing laminate.

SUMMARY OF THE INVENTION

One or more embodiments of the present invention provide a fortified flashing laminate including (a) an uncured thermosetting polymeric layer having a top surface and a bottom surface; (b) a first layer of vulcanized adhesive tape covering at least a portion of said bottom surface of said polymeric layer; and (c) a reinforcing layer of vulcanized adhesive tape covering a portion of said first layer of vulcanized adhesive tape, said reinforcing layer of vulcanized adhesive tape being smaller than said first layer of vulcanized adhesive tape.

One or more embodiments of the present invention also provides a fortified flashing laminate including (a) an uncured EPDM polymeric layer having a top surface and a bottom surface; (b) a first layer of vulcanized adhesive tape covering substantially all of said bottom surface of said polymeric layer; and (c) a second layer of vulcanized adhesive tape covering a portion of said first layer of vulcanized adhesive tape to form a fortified area of the flashing laminate.

One or more embodiments of the present invention also provides a roof assembly including (a) a roofing membrane secured over a roof deck; (b) a curb penetrating the roof assembly and secured to the roof deck; (c) a curb flashing covering the curb; and (d) a flashing laminate covering the seam between said roofing membrane and said curb flashing, said flashing laminate including (i) an uncured thermosetting polymeric layer having a top surface and a bottom surface, (ii) a first layer of vulcanized adhesive tape covering substantially all of said bottom surface of said polymeric layer, and (iii) a second layer of vulcanized adhesive tape covering a portion of said first layer of vulcanized adhesive tape to form a fortified area of said flashing laminate, wherein said fortified area of said flashing laminate is positioned at the seam between said curb flashing and said roofing membrane.

One or more embodiments of the present invention also provides a roof assembly including (a) a roofing membrane secured over a roof deck; (b) a roofing penetration extending upward through an opening in said roofing membrane; and (c) a flashing laminate covering the edge of said opening around said penetration and secured to said roofing membrane and said penetration, said flashing laminate including (i) an uncured thermosetting polymeric layer having a top surface and a bottom surface, (ii) a first layer of vulcanized adhesive tape covering substantially all of said bottom surface of said polymeric layer, and (iii) a second layer of vulcanized adhesive tape covering a portion of said first layer of vulcanized adhesive tape to form a fortified area of said flashing laminate, wherein said fortified area of said flashing laminate is positioned over said edge of said opening.

One or more embodiments of the present invention also provides a method of making a flashing laminate including the steps of (a) forming a polymeric sheet having a top surface and a bottom surface; (b) laminating a first layer of vulcanized adhesive tape to the bottom surface of the polymeric sheet; and (c) securing a second layer of vulcanized adhesive tape to the first layer of vulcanized adhesive tape, wherein the second layer of vulcanized adhesive tape is smaller than the first layer of vulcanized adhesive tape.

DETAILED DESCRIPTION OF THE ILLUSTRATIVE EMBODIMENTS

Figure 1:
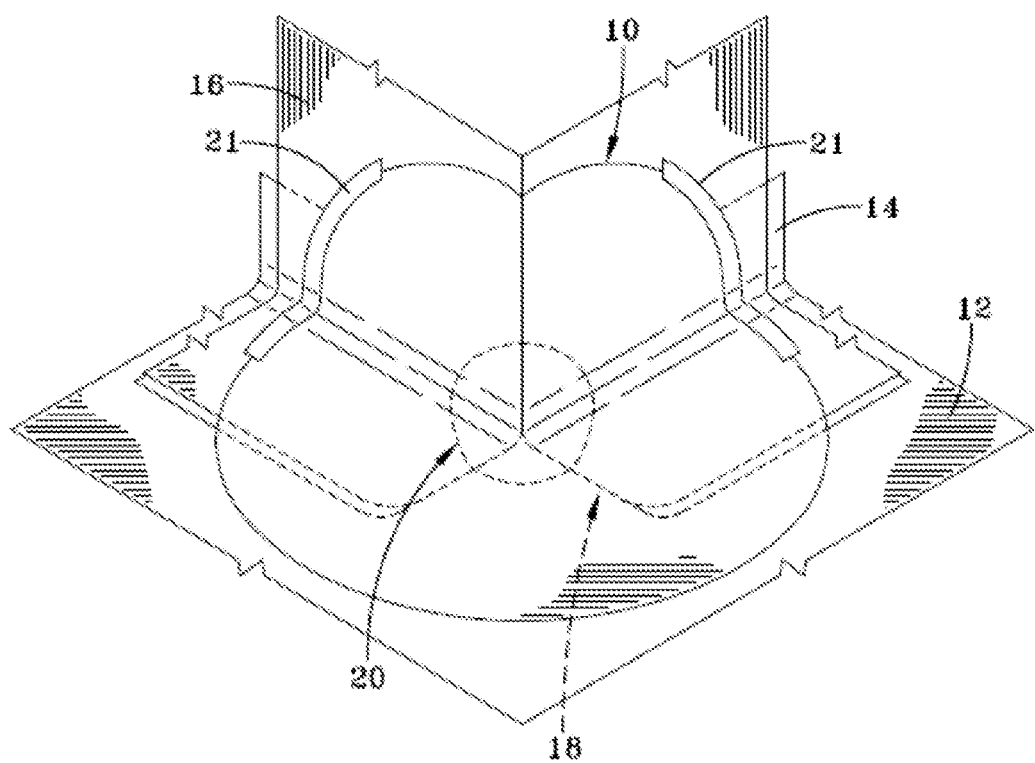
FIG. 1 is an isometric view of a corner flashing installed in a roofing membrane assembly according to embodiments of the present invention.

Flashing laminates made in accordance with the present invention include a polymeric layer laminated to a vulcanized adhesive tape layer, and a second layer of vulcanized adhesive tape applied over a portion of the adhesive tape layer to create a fortified area of the flashing laminate. The second layer of vulcanized adhesive tape, which may also be referred to as a reinforcing layer, provides added strength to the fortified area of the flashing laminate. The reinforcing layer helps to reduce damage to the uncured polymeric layer of the flashing laminate during and after installation and prior to any substantial curing of the polymeric layer by increasing the tensile strength and puncture resistance of the flashing laminate at the area of coverage. The reinforcing layer of adhesive tape may be applied to specific and defined regions of the flashing laminate that are known to be vulnerable to damage when installed in certain locations in the roofing assembly.

The polymeric layer of the flashing laminate may be made from any thermosetting material (also referred to as vulcanizable or curable materials) known to those skilled in the art. Commercially available thermosetting flashing membranes may include elastomeric copolymers such as ethylene-propylene-diene copolymer (EPDM) rubber, polychloroprene based rubbers, and functionalized olefins such as chlorosulfonated polyethylene (CSPE).

The polymeric layer of the flashing laminate is manufactured and provided to the installation site in an uncured (unvulcanized) state, otherwise referred to as a green flashing. As used herein, the terms un-cured, un-vulcanized and green refer to a thermosetting material that has not been appreciably cured, vulcanized, or set. The green polymeric layer facilitates installation of the flashing laminate because it is formable, as opposed to cured or vulcanized flashing materials, which are not as easily formable. The green flashing cures after installation and after a period of exposure to heat on the roofing surface, and may thereafter be considered a cured or vulcanized flashing.

In one or more embodiments, uncured portions of the polymeric layer may be characterized by a green strength modulus at 73° F. of less than approximately 300 PSI, in other embodiments less than approximately 275 PSI, in other embodiments less than approximately 260 PSI, and in yet other embodiments less than approximately 250 PSI. In these or other embodiments, uncured portions of EPDM flashings may be characterized by a tensile strength of less than approximately 300 PSI, in other embodiments less than approximately 275 PSI, in other embodiments less than approximately 260 PSI, and in yet other embodiments less than approximately 250 PSI. In the same or other embodiments, uncured portions of EPDM flashings may be characterized by a minimum tensile set of 80%.

In one or more embodiments, the polymeric layer may have a thickness of greater than 0.040 inches (1.02 mm). In other embodiments, the polymeric layer may have a thickness greater than 0.050 inches (1.27 mm). In still other embodiments, the polymeric layer may have a thickness greater than 0.055 inches (1.40 mm). In one or more embodiments, the polymeric layer may have a thickness of less than 0.080 inches (2.03 mm). In other embodiments, the polymeric layer may have a thickness less than 0.070 inches (1.78 mm). In still other embodiments, the polymeric layer may have a thickness less than 0.065 inches (1.65 mm).

In one or more embodiments, uncured portions of Chloroprene flashings may be characterized by a green strength modulus at 73° F. of less than approximately 100 PSI, in other embodiments less than approximately 90 PSI, in other embodiments less than approximately 80 PSI, and in yet other embodiments less than approximately 75 PSI. In these or other embodiments, uncured portions of EPDM flashings may be characterized by a tensile strength of less than approximately 100 PSI, in other embodiments less than approximately 90 PSI, in other embodiments less than approximately 80 PSI, and in yet other embodiments less than approximately 75 PSI. In the same or other embodiments, uncured portions of Chloroprene flashings may be characterized by a minimum tensile set of 80%.

The adhesive tape of the flashing laminate of the present invention is a vulcanized adhesive tape. As used herein, vulcanized adhesive tape refers to an adhesive tape that has been cured sufficiently to give the adhesive tape a tensile strength of greater than 35 psi. The adhesive tape may be a solid adhesive, which may also be referred to as a solid adhesive strip, and may include those that are conventional in the art. In one or more embodiments, the adhesive tape may include EPDM and/or butyl rubber. In one or more embodiments, the adhesive tape includes at least 85% solids. In other embodiments, the adhesive tape includes at least 90% solids. In still other embodiments, the adhesive tape includes at least 95% solids. In yet other embodiments, the adhesive tape includes at least 99% solids.

In one or more embodiments, the adhesive tape may have a thickness of greater than 0.007 inches (0.178 mm). In other embodiments, the tape may have a thickness greater than 0.010 inches (0.25 mm). In still other embodiments, the adhesive tape may have a thickness greater than 0.015 inches (0.381 mm). In one or more embodiments, the adhesive tape may have a thickness of less than 0.100 inches (2.54 mm). In other embodiments, the tape may have a thickness less than 0.080 inches (2.03 mm). In still other embodiments, the adhesive tape may have a thickness less than 0.070 inches (1.78 mm). In one or more embodiments, the adhesive tape may cover the entire bottom surface of the polymeric layer. In other embodiments, the adhesive tape may cover substantially the entire bottom surface of the polymeric layer.

Useful adhesive tapes are disclosed in U.S. Pat. Nos. 6,120, 869, 5,888,602, 5,859,114, 5,733,621, 5,612,141, 5,563,217, 5545685, 5,504,136, 5,242,727, 4,932,171, 4,849,268, 4,657, 958, 4,855,172, and 4,588,637, which are incorporated herein by reference. Useful tapes are commercially available including those available under the trade names QuickSeam™ (Firestone), PLIOSEAL™ (Ashland), 510™ (ADCO), 505™ (ADCO), SecureTAPE™ (Carlisle).

The flashing laminate of the present invention may be provided in a variety of various sizes and shapes to accommodate any number of installation situations. For example, specific flashing laminates are manufactured for corner flashings where vertical surfaces form an exterior corner. A particular area that frequently provides a point of vulnerability in flashing applications is an intersection between horizontal and vertical surfaces that must be sealed. For instance, the intersection of the roofing membrane and a curb flashing creates a vulnerable region where the two perpendicular surfaces intersect.

In one or more embodiments, the flashing laminate of the present invention may also include a fortified area. In certain embodiments, the fortified area is formed by applying a second layer of vulcanized adhesive tape to the existing adhesive tape on the bottom of the polymeric layer. The second layer of adhesive tape may also be referred to as a reinforcing layer. The second layer of adhesive tape may be applied together with the first layer of adhesive tape, or may be applied as a supplemental step in the manufacturing process. In one or more embodiments, the second layer of adhesive tape may be substantially identical to the first layer of adhesive tape in composition and/or thickness. In other embodiments, the second layer of adhesive tape may differ from the first layer of adhesive tape in composition and/or thickness.

The second layer of vulcanized adhesive tape is applied in a particular region of the flashing laminate known to be vulnerable to damage during installation and during the curing period of the flashing laminate after being installed in a roofing system. The size and shape of the fortified area may vary according to the size and shape of the flashing laminate, the intended use of the flashing laminate, and the resulting vulnerable area of the flashing laminate. The additional layer of vulcanized adhesive tape increases the overall puncture resistance of the flashing laminate when tested using Puncture Resistance Testing ASTM D4833 as compared to identical flashing laminates without the second layer of vulcanized adhesive tape.

In addition, the second layer of vulcanized adhesive tape applied at the fortified area increases the force necessary to extend and stretch the non-vulcanized polymeric layer, making the flashing laminate stronger and more resistant to damage from movement when subjected to Tensile and Elongation Testing according to ASTM D412. Furthermore, the second layer of vulcanized adhesive tape applied at the fortified area increases the thickness of the vulcanized tape adhesive at vulnerable areas, which reduces the potential for thinning of the flashing portion during installation, acts as a cushion to reduce damage during and after installation, and acts as a bridge between gaps at non-supported areas to receive the flashing laminates.

In one or more embodiments, a release liner may be provided over the adhesive layers of the flashing laminate to protect the adhesive and to prevent unintended adhesion. The release liner may include a polymeric film or coated paper to which the adhesive may form a temporary bond. However, this bond can be readily broken by applying minimal tension. The release liner is easily removed by a technician immediately prior to installing the flashing laminate as part of a roofing system.

In one or more embodiments, the release liner may include a paper or cellulosic structure coated with a polymeric coating. In other embodiments, the release liner may include a homogeneous polymeric structure; for example, the release liner may include a polyester or polyolefin film. Suitable materials for the release liner include polypropylene, polyester, high-density polyethylene, medium-density polyethylene, low-density polyethylene, polystyrene or high-impact polystyrene. Such polymeric materials offer a number of advantageous properties, including high moisture resistance, good resistance to temperature fluctuations during processing and storage, high tear resistance. In one or more embodiments, these release liners may also be provided with anti-static surface coatings and/or anti-stick surface coatings. In addition to the above polymeric release liner materials, the release liner may also be made of kraft paper.

Several examples of fortified flashing laminates are provided below as illustrative embodiments of the invention. It will be appreciated by those skilled in the art that conventional installation techniques may be employed in the installation of any embodiment of the flashing laminate, despite the inclusion of a second layer of fortifying adhesive tape. For instance, a primer may be applied between the adhesive tape and the surface to which it adheres to form a stronger adhesive bond. Although the primer layer is not shown or discussed in the illustrative embodiments herein, it is contemplated that a primer may be applied to an underlying contact surface and allowed to dry prior to positioning and adhering the flashing laminate.

Referring now to FIG. 1, a flashing laminate is shown, and is generally indicated by the numeral 10. Flashing laminate 10 is a corner flashing laminate and is installed at the intersection of an exterior corner of vertical walls and the horizontal roof surface. A roofing membrane 12 is positioned over the roof surface and may be installed by any method known to those skilled in the art. In one or more embodiments, the roofing membrane 12 may be an EPDM based membrane. A portion of the roofing membrane 12 may extend upward on the vertical walls to create an overlapping membrane portion 14. A curb flashing 16 is applied over the vertical walls and the roofing membrane 12, including the overlapping portion 14. Curb flashing 16 includes a cut-out corner area 18 to facilitate the installation and positioning of the tape at the corner. Curb flashing 16 may include an adhesive layer to facilitate adhesion to membrane 12 and to the vertical walls, or may be adhered using a solvent based adhesive applied on the curb surface. In one or more embodiments, curb flashing 16 may be similar to the fortified flashing laminate 50 discussed below.

Flashing laminate 10 has a generally circular shape and is positioned at the intersection of the outside corner of the vertical walls and the horizontal roof surface. However, it will be appreciated by those skilled in the art that flashing laminate 10 may have any desired shape or configuration without deviating from the scope of the present invention, unless so claimed. Flashing laminate 10 includes a polymeric layer made of uncured vulcanizable material, such as EPDM, and a first layer of vulcanized tape adhesive laminated to a bottom surface of the polymeric layer. A vulnerable area of flashing laminate 10 has been identified as the area over and immediately surrounding the intersection of the two vertical wall surfaces and the horizontal roof surface. Therefore, a generally circular fortified area 20 is provided at this portion of flashing laminate 10, and is indicated by dashed lines in FIG.

1. Fortified area 20 is provided with a second layer of vulcanized adhesive tape on the underside of the flashing laminate to reinforce and strengthen the flashing laminate at a point of weakness. The green nature of the polymeric layer of flashing laminate 10 facilitates installation by rendering the flashing laminate formable, thereby allowing it to conform to the underlying shape of the roofing system, while the fortified area 20 protects against damage to the flashing laminate, including the uncured polymeric layer.

Flashing laminate 10 is adhered to the roofing membrane 12 and curb flashing 16 by virtue of the adhesive properties of the first and second layers of adhesive tape. In certain embodiments, a lap sealant 21 may be applied at part of all of the edge of flashing laminate 10 to further protect against water infiltration.

Figure 2:
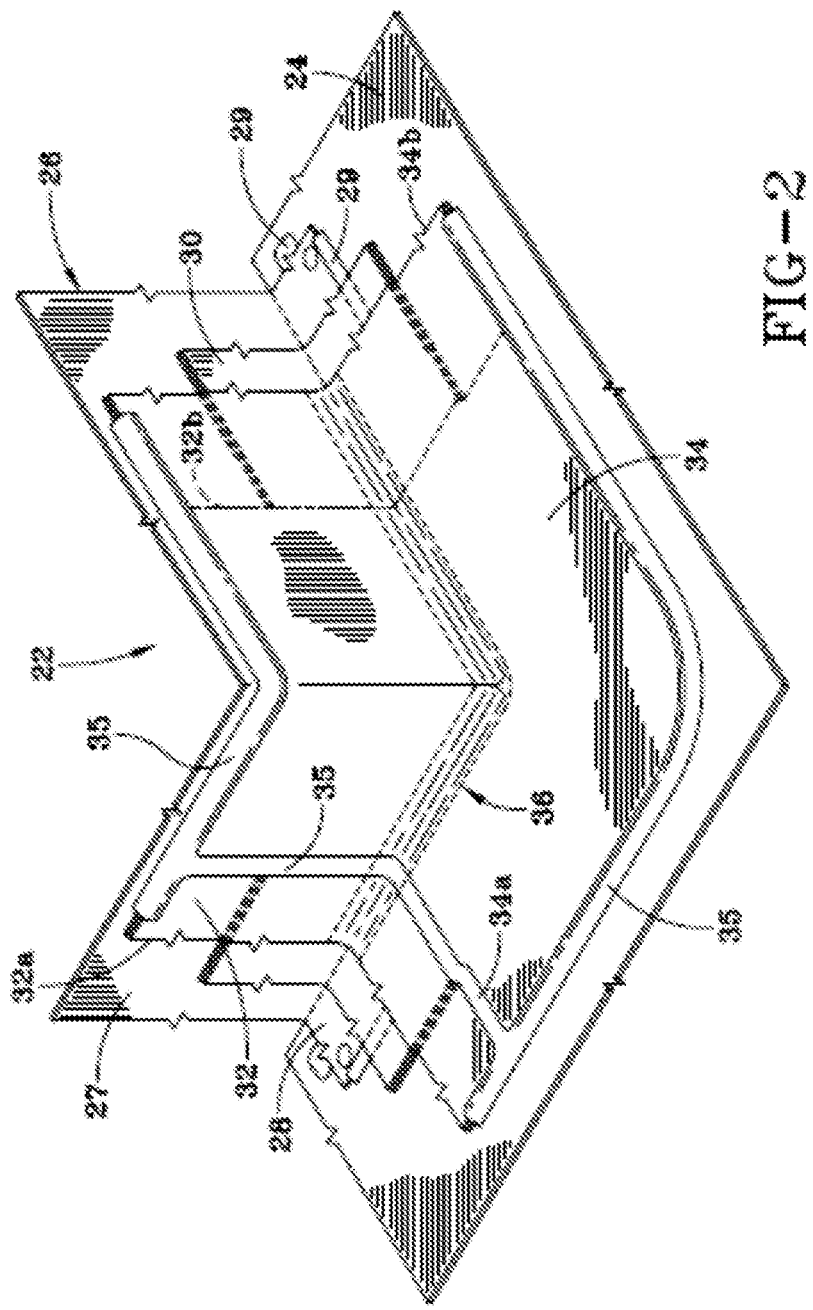
FIG. 2 is an alternative embodiment of a corner flashing installed in a roofing membrane assembly according to embodiments of the present invention.

Referring now to FIG. 2, a flashing laminate assembly is shown, and is generally indicated by the numeral 22. Flashing laminate assembly 22 includes a roofing membrane 24 positioned over the roof surface, which may be installed by any method known to those skilled in the art. In one or more embodiments, roofing membrane 24 may be an EPDM based membrane. A metal curb 26 is positioned at an edge of roofing membrane 24 and includes a vertical portion 27 and a horizontal flange portion 28, which overlies a portion of roofing membrane 24. A sealant 29 may be applied under the horizontal flange portion 28 of metal curb 26 and/or at the edge of horizontal flange portion 28. It is contemplated that the metal curb 26 may be secured with fasteners to the roof deck or to a wood nailer provided for securing the metal curb, as is known in the art.

A strip of flashing 30 is applied over a portion of the vertical portion 27 of metal curb 26, and over and beyond the horizontal flange portion 28. Flashing 30 may be any known flashing, and may include a pre-applied adhesive to facilitate installation. In one or more embodiments, flashing 30 may be a 5" flashing having a pre-applied adhesive. In other embodiments, a solvent based adhesive may be used to bond flashing 30 to metal curb 26 and roofing membrane 24.

A first wrap of corner flashing laminate 32 is applied over flashing 30 and extends beyond the edges of flashing 30 in both the horizontal and vertical directions. First corner flashing 32 wraps from a first side of the vertical corner 32a to the second side of the vertical corner 32b (edge represented by vertical dashed line). First corner flashing 32 includes a pre-applied adhesive on a bottom surface of a green polymeric layer. In one or more embodiments, first corner flashing 32 may be a 9" flashing and may extend beyond flashing 30 by several inches at each edge.

A second wrap of corner flashing laminate 34 is applied over first corner flashing 32. Second corner flashing 34 may be identical to first corner flashing 32, and wraps from the first side of the vertical corner 34a to the second side of the vertical corner 34b. Second corner flashing 34 is off-set from first corner flashing 32 so that a portion of first corner flashing adjacent to edge 32a remains exposed, and a portion of second corner flashing adjacent to edge 34b extends beyond first corner flashing 32. In one or more embodiments, a sealant 35 may be applied to the top and bottom edges of first and second corner flashings 32 and 34 and at the edge of second corner flashing 34a.

A fortified area 36 on each of corner flashing laminates 32 and 34 exists at the area where the flashings bend between the horizontal roof surface and the metal curb, shown in FIG. 2 by dashed lines. This fortified area is provided with a second layer of vulcanized adhesive tape on a bottom surface of the flashing laminate 32 and 34 to strengthen and fortify this area of the flashing laminate. The green nature of the polymeric layer of flashing laminates 30, 32 and 34 facilitates installation by rendering the flashing laminate formable, thereby allowing it to conform to the underlying shape of the roofing system, while the fortified area 36 protects against damage to the flashing laminate, including the uncured polymeric layer, at the vulnerable corner portion.

Figure 3:
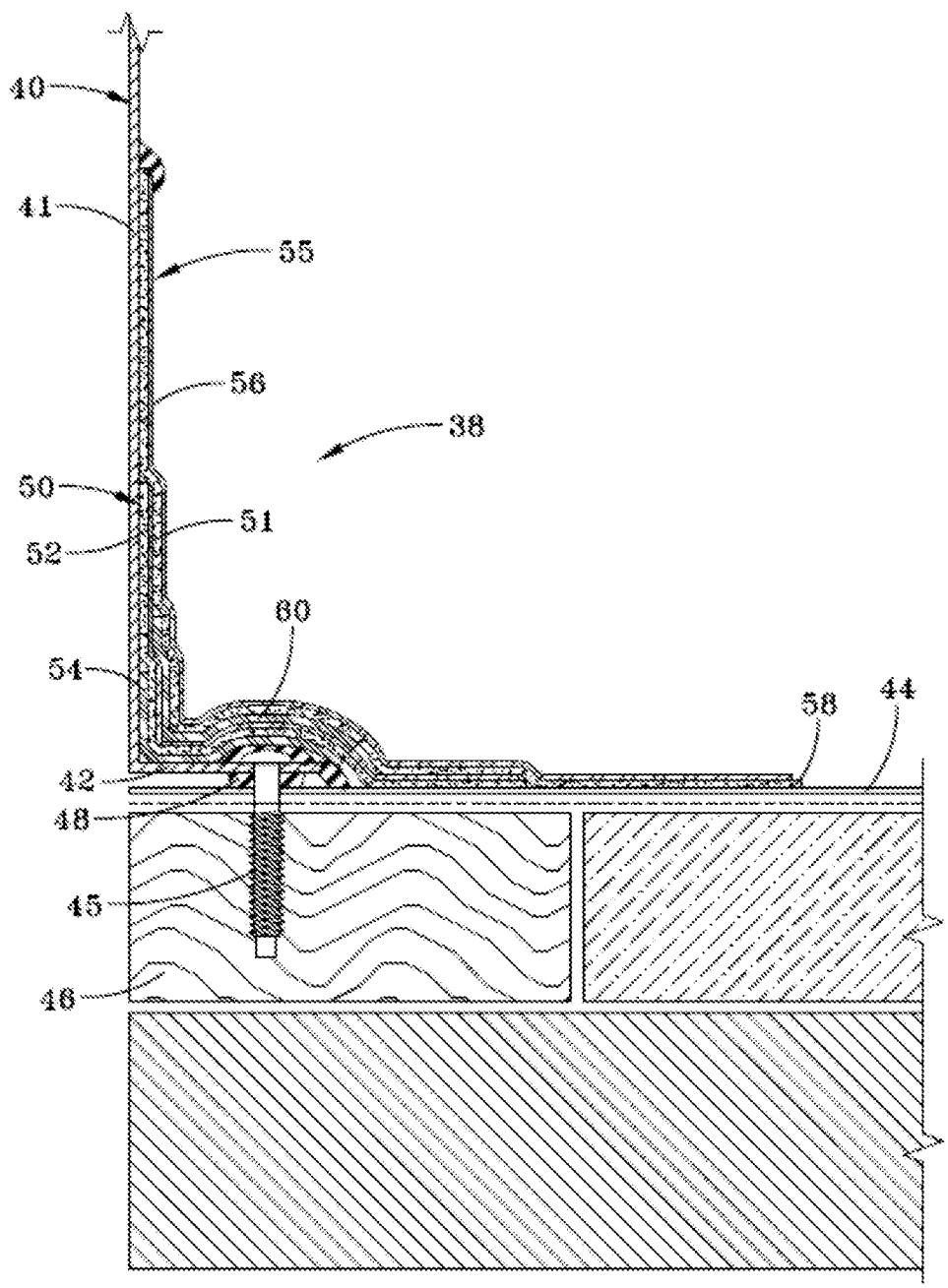
FIG. 3 is a sectional view of a flashing laminate installed at the base of a curb according to embodiments of the present invention.

Referring now to FIG. 3, a flashing laminate assembly is shown, and is indicated generally by the numeral 38. Flashing laminate assembly 38 is similar to flashing laminate assembly 22, but is not installed at a corner, and therefore includes only a single layer of outer flashing laminate. A metal curb 40, including a vertical portion 41 and a horizontal flange portion 42, is positioned at an edge of a roofing membrane 44. A fastener 45 passes through the horizontal flange portion 42 of metal curb 40 and into a roof deck 46 to secure the metal curb in place. A sealant 48 is provided around the head of fastener 45 to seal the opening in the horizontal flange portion 42, and at the edge of the horizontal flange portion 42 to form a seal with the roofing membrane 44.

A first flashing laminate 50, including a green polymeric layer 51 and a first vulcanized adhesive tape layer 52, is positioned over a portion of the vertical portion 41 of metal curb 40, over the horizontal flange 42 of metal curb 40, and over a portion of the roofing membrane 44 adjacent to metal curb 40. In one or more embodiments, first flashing laminate 50 may be a strip of 5" flashing laminate. A fortified area is formed by a second layer of vulcanized adhesive tape 54 provided adjacent to the first layer of vulcanized adhesive tape 52 over the portion of the first flashing laminate 50 that transitions from the horizontal roof surface (roofing membrane 44) to the vertical surface 41 of the metal curb 40. As already discussed, the second layer of vulcanized adhesive tape 54 fortifies the first flashing laminate 50 at a vulnerable area.

A second flashing laminate 55, including a green polymeric layer 56 and a first vulcanized adhesive tape layer 58, is positioned over first flashing laminate 50. In one or more embodiments, second flashing laminate 55 may be a strip of 9" flashing laminate, and may be positioned so that it extends approximately 2" beyond the edges of first flashing laminate 50. A fortified area is formed by a second layer of vulcanized adhesive tape 60 provided adjacent to the first layer of vulcanized adhesive tape 58 over the portion of the second flashing laminate 55 that transitions from the horizontal roof surface (roofing membrane 44) to the vertical surface 41 of the metal curb 40, which is partially covered by the first adhesive flashing laminate 50. The second layer of vulcanized adhesive tape 60 strengthens the second flashing laminate 55 at the vulnerable transition area between the horizontal roof surface (roofing membrane 44) and the vertical surface of the metal curb 40.

Figure 4:
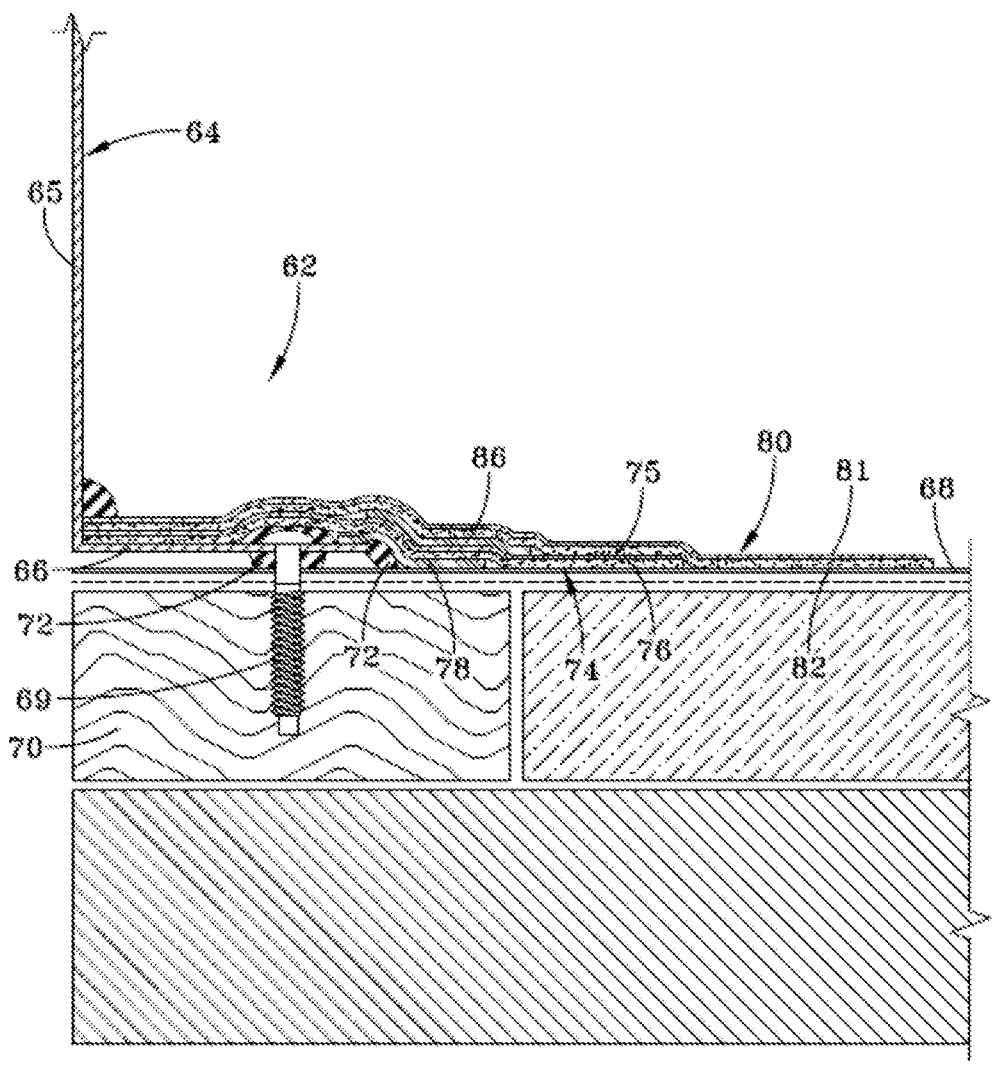
FIG. 4 is an alternate embodiment of a flashing laminate installed at the base of a curb according to embodiments of the present invention.

Referring now to FIG. 4, another embodiment of a flashing laminate assembly is shown, and is indicated generally by the numeral 62. Flashing laminate assembly 62 is similar to flashing laminate assembly 38. A metal curb 64, including a vertical portion 65 and a horizontal flange portion 66, is positioned at an edge of a roofing membrane 68. In one or more embodiments, a fastener 69 passes through the horizontal flange portion 66 of metal curb 64 and into a roof deck 70 (or a wood nailer) to secure the metal curb in place. A sealant 72 may be provided around the head of fastener 69 to seal the opening in the horizontal flange portion 66, and at the edge of the horizontal flange portion 66 to form a seal with the roofing membrane 68.

A first flashing laminate 74, including a green polymeric layer 75 and a first vulcanized adhesive tape layer 76, is positioned over the horizontal flange portion 66 of metal curb 64, and over a portion of the roofing membrane 68 adjacent to metal curb 64. In one or more embodiments, first flashing laminate 74 may be a strip of 5" flashing laminate. A fortified area is formed by a second layer of vulcanized adhesive tape 78 provided adjacent to the first layer of vulcanized adhesive tape 76 over the portion of the first flashing laminate 74 that transitions from the horizontal roof surface (roofing membrane 68) to the horizontal flange portion 66 of the metal curb 64. The second layer of vulcanized adhesive tape 78 fortifies the first flashing laminate 74 at the vulnerable transition area.

A second flashing laminate 80, including a green polymeric layer 81 and a first vulcanized adhesive tape layer 82, is positioned over first flashing laminate 74. In one or more embodiments, second flashing laminate 80 may be a strip of 9" flashing laminate, and may be positioned so that it extends approximately 4" beyond the edge of first flashing laminate 74 on roofing membrane 68. A fortified area is formed by a second layer of vulcanized adhesive tape 86 provided adjacent to the first layer of vulcanized adhesive tape 82. The second layer of vulcanized adhesive tape 86 is provided at the portion of the second flashing laminate 80 that transitions from the horizontal roof surface (roofing membrane 68) to the horizontal flange portion 66 of the metal curb 64, which is covered by the first adhesive flashing laminate 74. The second layer of vulcanized adhesive tape 86 strengthens the second flashing laminate 80 at the vulnerable transition area.

Figure 5:
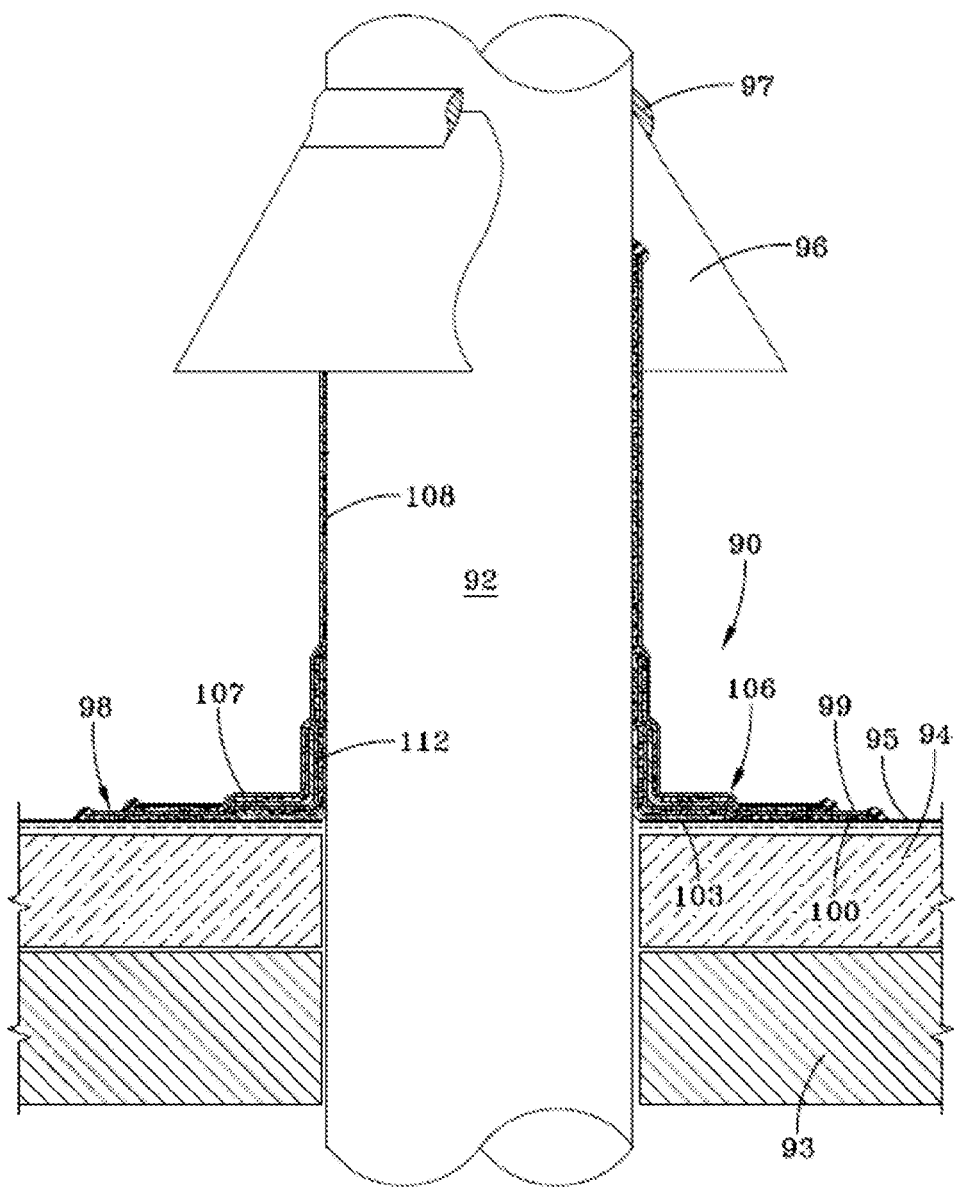
FIG. 5 is a sectional view of a flashing laminate installed around a roofing penetration according to embodiments of the present invention.

Referring now to FIG. 5, another embodiment of a flashing laminate assembly is shown, and is indicated generally by the numeral 90. Flashing laminate assembly 90 is installed around a roof penetration 92, which may be an exhaust pipe, as shown in the drawing. However, it is contemplated that flashing laminate assembly 90 could be utilized to seal a roofing system around any type of roof penetration known to those skilled in the art. Roof penetration 92 extends upward through a roof deck 93, an insulation board 94, and a roofing membrane 95. A hood 96 may optionally be provided adjacent the top of the penetration to direct precipitation away from the seams of the flashing laminate assembly 90, and where provided, a sealant 97 may be included at a top edge of hood 96 to prevent water infiltration between the hood and the penetration.

A first flashing laminate 98, including a green polymeric layer 99 and a first vulcanized adhesive tape layer 100, is positioned around roof penetration 92 at the intersection with roofing membrane 95. A portion of first flashing laminate 98 extends vertically on the exterior of the roof penetration 92, and a second portion extends horizontally over roofing membrane 95. In one or more embodiments, first flashing laminate 98 may be a strip of 5" flashing laminate. A fortified area is formed by a second layer of vulcanized adhesive tape 103 provided adjacent to the first layer of vulcanized adhesive tape 100 at the corner portion of the first flashing laminate 98 that transitions from roofing membrane 95 to roof penetration 92. The second layer of vulcanized adhesive tape 103 strengthens the first flashing laminate at the vulnerable transition area between the roofing membrane 95 and the penetration 92.

A second flashing laminate 106, including a green polymeric layer 107 and a first vulcanized adhesive tape layer 108, is positioned over first flashing laminate 98. In one or more embodiments, second flashing laminate 106 may be a 9" flashing laminate, and may be positioned so that it extends up the outer surface of roof penetration 92 beyond the top edge of first flashing laminate 98. A fortified area is formed by a second layer of vulcanized adhesive tape 112 provided adjacent to the first layer of vulcanized adhesive tape 108. The second layer of vulcanized adhesive tape 112 is provided at the corner portion of the second flashing laminate 106 that transitions from roofing membrane 95 to roof penetration 92, which is covered by the first adhesive flashing laminate 98. The second layer of vulcanized adhesive tape 112 strengthens the second flashing laminate 106 at the transition area created by the intersection of the roofing membrane 95 and the penetration 92.

Figure 6:
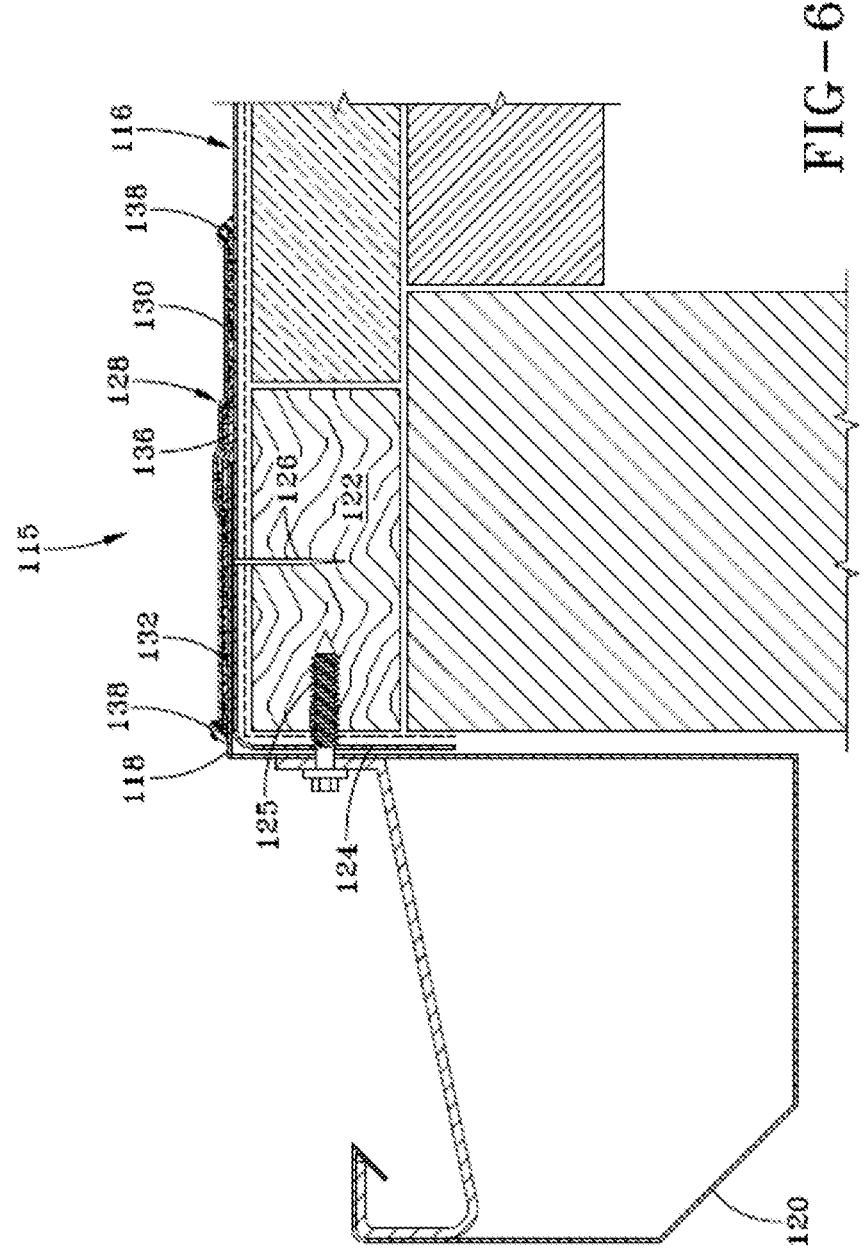
FIG. 6 is a sectional view of a flashing laminate installed at a roof edge gutter guard according to embodiments of the present invention.

Referring now to FIG. 6, yet another embodiment of a flashing laminate assembly is shown and is indicated generally by the numeral 115. Flashing laminate assembly 115 is installed at the edge of a roofing membrane 116 and over a gutter flange 118 extending from a gutter 120 secured to the roof deck 122 (or a nailer). Roofing membrane 116 extends over the edge of the roof deck 122 and includes an overhang portion 124 that covers the vertical exterior face of the roof deck. The gutter flange 118 extends upward from the gutter, and then over the horizontal portion of the roofing membrane 116. The gutter 120 and gutter flange 122 are secured by fasteners 125 and 126, respectively.

A flashing laminate 128, including a green polymeric layer 130 and a first vulcanized adhesive tape layer 132, is positioned over the edge of the gutter flange 118 to seal the seam between the flange 118 and the roofing membrane 116. In one or more embodiments, flashing laminate 128 may be a 5" flashing laminate. A fortified area is formed by a second layer of vulcanized adhesive tape 136 provided adjacent to the first layer of vulcanized adhesive tape 132 over the portion of the flashing laminate 128 that transitions from roofing membrane 116 to gutter flange 118. The second layer of vulcanized adhesive tape 132 strengthens the flashing laminate 128 at the vulnerable transition area between the roofing membrane 116 and the gutter flange 118. In one or more embodiments, a sealant 138 may be provided at each edge of flashing laminate 128 to further seal against water infiltration.

In yet another embodiment, the flashing laminates of the present invention include multiple green polymeric layers with a tape layer (e.g., vulcanized adhesive tape) interleaved between the green polymeric layers. In one or more embodiments, the laminates of the invention include a green polymeric layer and a tape layer in a first portion of the laminate, and a green polymeric layer and a tape layer in a second portion of the laminate, where the tape layer of the first portion is mated to the green polymeric layer of the first portion. In one or more embodiments, the first portion may be referred to as the sealing portion of the laminate, and the second portion may be referred to as the fortified area of the laminate. In one or more embodiments, the sealing portion of the laminate has a larger planar surface than the fortified area of the laminate. In other words, and consistent with the practice of the invention, the fortified area offers additional strength to only a portion (e.g. the most vulnerable portion) of the sealing portion of the laminate.

Figure 7:
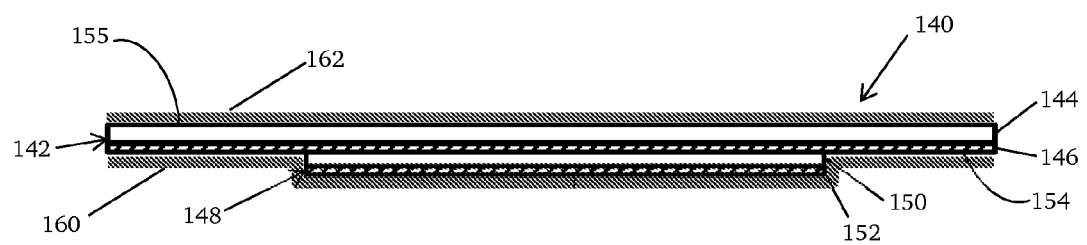
FIG. 7 is a cross sectional view of a flashing laminate having multiple polymeric layers according to embodiments of the present invention.

For example, FIG. 7 depicts flashing laminate 140 having first portion 142, which may also be referred to as sealing portion 142, which includes first green polymeric layer 144 and tape layer 146. Flashing laminate 140 also includes second portion 148, which may also be referred to as fortified area 148, which includes second green polymeric layer 150 and second tape layer 152. In one or more embodiments, first green polymeric layer 144 and tape layer 146 are coextensive (i.e., they have the same width). In these or other embodiments, second green polymeric layer 150 and second tape layer 152 are coextensive. In these or other embodiments, and as shown in FIG. 7, sealing portion 142 includes a larger planar surface than fortified area 148. In other words, in one or more embodiments, the width of sealing portion 142 in a given direction is larger than the corresponding width of fortified area 148 in that same direction. As a result of this configuration, fortified area 148 only covers a portion of first tape layer 146 thereby forming an exposed area 154. Flashing laminate 140 may also include, prior to installation, release liner 160, which may be disposed over second tape layer 152, as well as exposed area 154. Release liner 160 may include those release liners described above with respect to other embodiments. Additionally, flashing laminate may optionally include a second release liner 162, which may be disposed over the exposed surface 155 of first green polymeric layer 144 (i.e. on the top surface 155 of layer 144).

As with the other embodiments described herein, first and second tape layers (146 and 152) may include vulcanized adhesive tape. In these or other embodiments, the vulcanized adhesive tape layers (146 and 152) may be similarly characterized. For example, they may be compositionally the same and may have similar thickness. Likewise, first and second green polymeric layers (144 and 150) may be similarly characterized. For example, they may be compositionally the same and may similar thickness.

It has advantageously been discovered that the flashing laminates of these embodiments (i.e., those embodiments where the laminates include multiple polymeric layers) not only demonstrate advantages due to the increased fortification offered by the second polymeric layer, which is disposed in the fortified area, but also offer manufacturing advantages. For example, during manufacture of the laminate, a first laminate can be formed by mating a green polymeric sheet to a tape. This laminate can then be further fabricated by shaping (e.g., cutting) the laminate to a desired configuration. Excess material from the first laminate can then be shaped to a desired configuration and mated with the first laminate to form the fortified area of the laminate.

Additionally, the skilled person will understand the laminates of these embodiments (i.e., those where the laminate includes multiple polymeric layers) can be used in the various assemblies described above. Namely, the flashing laminates of these embodiments can be employed as a corner flashing laminate as shown in FIGS. 1 and 2, as a linear flashing, used in combination with a metal curb, as shown in FIGS. 3 and 4, as a flashing installed around a roof penetration as shown in FIG. 5, and as a linear flashing installed on a roof gutter flange as shown in FIG. 6.

Various modifications and alterations that do not depart from the scope and spirit of this invention will become apparent to those skilled in the art. This invention is not to be unduly limited to the illustrative embodiments set forth herein.

We claim:

1. A fortified flashing laminate comprising:
   (a.) an first uncured thermosetting polymeric layer having a top surface and a bottom surface;
   (b.) a first layer of vulcanized adhesive tape disposed on at least a portion of said bottom surface of said first polymeric layer;
   (c.) a second uncured thermosetting polymeric layer having a top surface and a bottom surface disposed on said bottom surface of said first layer of vulcanized adhesive tape; and
   (d.) a second layer of vulcanized adhesive tape disposed on at least a portion of said bottom surface of said second uncured thermosetting polymeric layer, where said second uncured thermosetting polymeric layer and said second layer of vulcanized adhesive tape are smaller in planar surface area than said first uncured thermosetting polymeric layer and said first layer of vulcanized adhesive tape.

2. The fortified flashing laminate of claim 1, wherein said first layer of vulcanized adhesive tape covers substantially all of said bottom surface of said first polymeric layer.

3. The fortified flashing laminate of claim 1, wherein said first layer of vulcanized adhesive tape covers the entire bottom surface of said first polymeric layer.

4. The fortified flashing laminate of claim 1, wherein said first uncured thermosetting polymeric layer and said second uncured thermosetting polymer layer include an EPDM polymer composition.

5. The fortified flashing laminate of claim 1, wherein the first and second layers of vulcanized adhesive tape each include at least 85% solids.

6. The fortified flashing laminate of claim 1, further comprising a release liner positioned over said second layer of vulcanized adhesive tape and an exposed portion of said first layer of vulcanized adhesive tape.

7. The fortified flashing laminate of claim 1, wherein said first polymeric layer is generally circular in shape.

8. The fortified flashing laminate of claim 7, wherein said second uncured polymeric layer is generally centered on and spaced from an outer edge of said first adhesive tape.

9. The fortified flashing laminate of claim 1, wherein said first polymeric layer is in the form of a longitudinally extending strip having longitudinal edges and a width.

10. The fortified flashing laminate of claim 9, wherein said second uncured thermosetting polymeric layer is in the form of a longitudinally extending strip having a width less than the width of said first adhesive tape.

11. The fortified flashing laminate of claim 10, wherein said second uncured thermosetting polymeric layer is spaced from the longitudinal edges of said first adhesive tape.

12. The fortified flashing laminate of claim 1, wherein said second layer of vulcanized adhesive tape has a tensile strength of greater than 35 psi.

13. A roof assembly comprising:
   a. a roofing membrane secured over a roof deck; and
   b. a flashing laminate positioned at a seam between said roofing membrane and a roof assembly component, said flashing laminate including:
      i. an first uncured thermosetting polymeric layer having a top surface and a bottom surface;
      ii. a first layer of vulcanized adhesive tape disposed on at least a portion of said bottom surface of said first polymeric layer;
      iii. a second uncured thermosetting polymeric layer having a top surface and a bottom surface disposed on said bottom surface of said first layer of vulcanized adhesive tape; and
      iv. a second layer of vulcanized adhesive tape disposed on at least a portion of said bottom surface of said second uncured thermosetting polymeric layer, where said second uncured thermosetting polymeric layer and said second layer of vulcanized adhesive tape are smaller in planar surface area than said first uncured thermosetting polymeric layer and said first layer of vulcanized adhesive tape.

14. The roof assembly of claim 13, wherein said first layer of vulcanized adhesive tape covers substantially all of said bottom surface of said first polymeric layer.

15. The roof assembly of claim 13, wherein said first layer of vulcanized adhesive tape covers the entire bottom surface of said first polymeric layer.

16. The roof assembly of claim 13, wherein said first uncured thermosetting polymeric layer and said second uncured thermosetting polymer layer include an EPDM polymer composition.

17. The roof assembly of claim 13, wherein the first and second layers of vulcanized adhesive tape each include at least 85% solids.

18. The roof assembly of claim 13, further comprising a release liner positioned over said second layer of vulcanized adhesive tape and an exposed portion of said first layer of vulcanized adhesive tape.

19. A method of making a flashing laminate having a fortified area comprising the steps of:
   a. forming an uncured polymeric sheet having a top surface and a bottom surface;
   b. laminating a layer of vulcanized adhesive tape to the bottom surface of the polymeric sheet to form a laminate;
   c. fabricating the laminate into a desired shape to thereby form a first laminate and a second laminate;
   d. fabricating the second laminate into a desired shape; and
   e. mating the first laminate to the second laminate to thereby form a flashing laminate having a fortified area.

20. The method of claim 19, further comprising the step of securing a release liner over the second layer of vulcanized adhesive tape and an exposed portion of the first layer of vulcanized adhesive tape.

\* \* \* \* \*